(12) United States Patent
Branca et al.

(10) Patent No.: US 8,812,475 B2
(45) Date of Patent: Aug. 19, 2014

(54) FACILITATING OBJECT SEARCHES IN VIRTUAL WORLDS

(75) Inventors: Salvatore Branca, Rome (IT); Paolo Cavazza, Rome (IT)

(73) Assignee: International Business Machines Corporation, Armonk, NY (US)

( * ) Notice: Subject to any disclaimer, the term of this patent is extended or adjusted under 35 U.S.C. 154(b) by 322 days.

(21) Appl. No.: 13/264,351

(22) PCT Filed: Mar. 10, 2010

(86) PCT No.: PCT/EP2010/053038
§ 371 (c)(1),
(2), (4) Date: Oct. 13, 2011

(87) PCT Pub. No.: WO2010/121863
PCT Pub. Date: Oct. 28, 2010

(65) Prior Publication Data
US 2012/0030214 A1 Feb. 2, 2012

(30) Foreign Application Priority Data

Apr. 20, 2009 (EP) .................................... 09158201

(51) Int. Cl.
*G06F 17/30* (2006.01)
*G06F 7/00* (2006.01)
*G06F 17/00* (2006.01)

(52) U.S. Cl.
USPC ........................... 707/706; 707/724; 707/918

(58) Field of Classification Search
USPC ........................................ 707/706, 724, 918
See application file for complete search history.

(56) References Cited

U.S. PATENT DOCUMENTS

| | | | |
|---|---|---|---|
| 5,450,343 A * | 9/1995 | Yurimoto et al. | 701/410 |
| 5,999,185 A | 12/1999 | Kato et al. | |
| 6,023,270 A | 2/2000 | Brush, II et al. | |
| 6,370,539 B1 * | 4/2002 | Ashby et al. | 701/532 |
| 6,539,107 B1 | 3/2003 | Michael et al. | |
| 2004/0249809 A1 | 12/2004 | Ramani et al. | |
| 2005/0002571 A1 | 1/2005 | Hiraga et al. | |
| 2005/0096841 A1 * | 5/2005 | Gedik et al. | 701/207 |

(Continued)

FOREIGN PATENT DOCUMENTS

| | | |
|---|---|---|
| JP | 10-293763 | 11/1998 |
| KR | 2005-0075826 B1 | 7/2005 |
| WO | WO 2010/121863 A1 | 10/2010 |

OTHER PUBLICATIONS

U.S. Appl. No. 13/675,418.

(Continued)

*Primary Examiner* — Kannan Shanmugasundaram
(74) *Attorney, Agent, or Firm* — Francis Lammes; Stephen J. Walder, Jr.; Yeen C. Tham

(57) ABSTRACT

A mechanism is provided for facilitating object search in a virtual world environment where each object is defined by a plurality of attributes and the search is performed on any attributes of the object however is not limited to a 3-D search. The co-ordinate location of each object in the virtual world is also provided in the search result and the range within which to perform the search may also be specified. Optionally, the user has the ability to teleport/transport to the location of the object using the search result.

22 Claims, 5 Drawing Sheets

(56) References Cited

U.S. PATENT DOCUMENTS

| | | | |
|---|---|---|---|
| 2006/0074834 | A1 | 4/2006 | Dong et al. |
| 2006/0101005 | A1* | 5/2006 | Yang et al. ............ 707/3 |
| 2008/0091654 | A1* | 4/2008 | Kang et al. ............ 707/3 |
| 2008/0220876 | A1 | 9/2008 | Mehta et al. |
| 2009/0100035 | A1* | 4/2009 | Cradick et al. ........ 707/5 |
| 2009/0106776 | A1* | 4/2009 | Kim et al. ............ 719/318 |

OTHER PUBLICATIONS

PCT International Search Report and Written Opinion dated May 11, 2010, PCT Application No. PCT/EP2010/053038, 10 pages.

"Travel Tours", http://slateit.org, printed Oct. 4, 2011, 11 pages.

Tanin, Egemen et al., "Building and Querying a P2P Virtual World", An International Journal on Advances of Computer Science for Geographic Information Systems, Academic Publishers, vol. 10, No. 1, Mar. 1, 2006, pp. 91-116.

\* cited by examiner

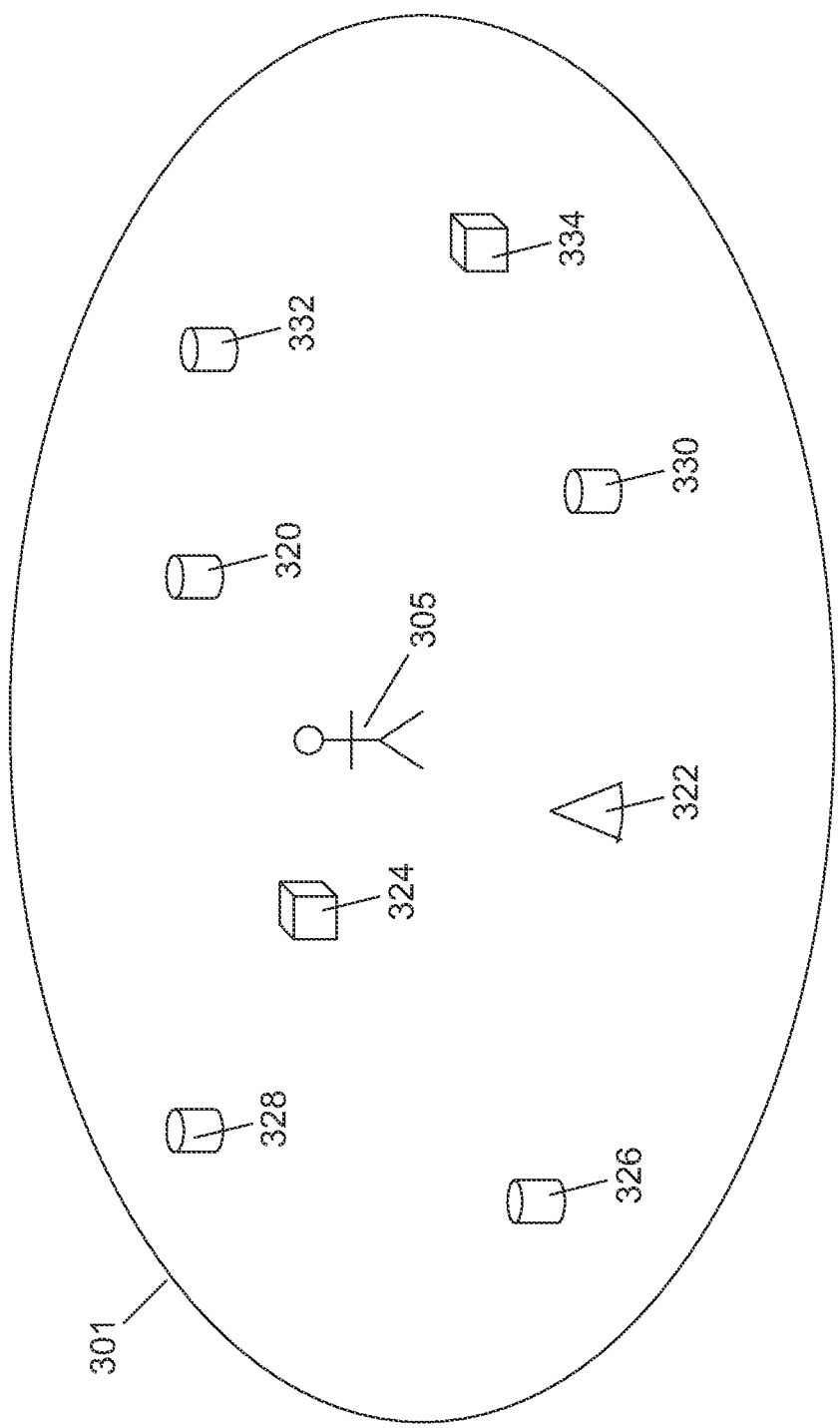

FACILITATING OBJECT SEARCHES IN VIRTUAL WORLDS

BACKGROUND

The present invention relates to the field of virtual worlds and more particularly a method and system for assisting a user in searching objects in a virtual world.

Searching for some specific place, event, object, kind of objects in a virtual world is a task that involves arriving in a (possibly) new or unknown region and moving and/or looking around a large area of the region inspecting several places or objects until the user finds what he is looking for. This process is often time consuming and poorly efficient since it implies the inspection of a potentially large number of places and objects that are of minor interest, if any, before the place or object of interest is found.

U.S. 2004/0249809 "METHOD, SYSTEM AND DATA STRUCTURE FOR PERFORMING SEARCHES ON THREE DIMENSIONAL OBJECTS" discloses techniques for searching on three dimensional (3D) objects across large, distributed repositories of 3D models. 3D shapes are created for input to a search system; optionally user-defined similarity criterion is used, and search results are interactively navigated and feedback received for modifying the accuracy of the search results. U.S. 2006/0074834 "METHOD AND SYSTEM FOR 3D OBJECT DETECTION USING LEARNING" discloses a method of 3D object detection which uses a learning procedure for feature selection from a feature set based on an annotated image-volume database, generating a set of selected features. U.S. 2005/0002571 "OBJECT SHAPE EXPLORATION USING TOPOLOGY MATCHING" also discloses a 3D analyzer that returns results which are invariant to rotation of the objects. This feature is useful to search engines for online shopping, where a user seeks goods by designating the general shape of the target. Other prior art involve displaying "items" within a specific category (places, people/groups, etc.), which can further be searched by keywords, however, these predefined set of categories are often too generic and therefore the results returned require additional inspection to find the item(s) of interest. Moreover, this kind of search engines often return results whose position is anywhere within the whole virtual world and do not provide any information about the proximity of each result to the current position of the user.

Current keyword-based search mechanisms are mainly based on some textual object properties, such as "Name" and "Description". Very often, these properties are left to their default values (e.g., name is something like "New Object" or "New Script" and description is empty) by the object creator, or they are stuffed with lots of keywords to make the item show up in as many search results as possible, causing this type of searches to be almost useless in such cases.

Recently an alternative solution to the problem of searching and finding the desired object has been identified in the practice of "tagging" in virtual worlds. Users assign tags to objects they found interesting in some way and share their tags with each other. However, this solution based on tagging is affected by the problem of "subjectiveness" of tags (i.e., identical objects can be tagged with different tags by different people) and would not provide an acceptable level of accuracy of search results.

It is an object of the present invention to provide a technique which alleviates the above drawbacks of the prior art.

SUMMARY

In one illustrative embodiment, a method, in a data processing system, is provided for facilitating object search in a virtual world environment, each object being defined by a plurality of attributes. The illustrative embodiment prompts a user in selecting a set of object attributes on which to perform the search. The illustrative embodiment prompts the user in defining for each selected object attribute a desired value or a range of desired values. The illustrative embodiment performs the search selecting a set of objects according to the user input. The illustrative embodiment then provides the search results, the search results include a location for the selected objects within the virtual world.

In other illustrative embodiments, a computer program product comprising a computer useable storage medium having a computer program is provided. The computer program, when executed on a data processing system, causes the data processing system to perform various ones of, and combinations of, the operations outlined above with regard to the method illustrative embodiment.

In yet another illustrative embodiment, a system is provided. The system may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

Embodiments of the invention will now be described, by way of example only, by reference to the accompanying drawings, in which:

FIGS. 3a and 3b show a schematic representation of a virtual environment with a user and a number of objects around the user.

DETAILED DESCRIPTION

In a preferred embodiment of the invention, the virtual search assistant takes the form of a regional (decentralized) index-based solution. In this case each virtual world region (for instance each island in SecondLife) maintains an index of all the objects present in the region by object type (i.e. by object categories) and attributes. Such index is refreshed on a periodic basis. This index is then made available to a "Search Assistant" which is able to execute queries to extract any desired information. In this case the "Search Assistant" implements both the search function and the result presentation function, while the indexing function is provided by the software that manages the virtual world region.

In another embodiment of the invention the virtual search assistant may take the form of a user agent-based solution. In this case an automatic software agent (robot) is sent to collect info on object types and their attributes in a specified spatial domain (for instance search can be done at virtual world level, at island level or in a user specified range). The user, by building a query for the "Search Assistant", triggers the robot data collection. The results are presented to the user while they are found and not at the end of the search. In this case the "Search Assistant" carries out all the functions: search, indexing and presentation.

Figure 1:
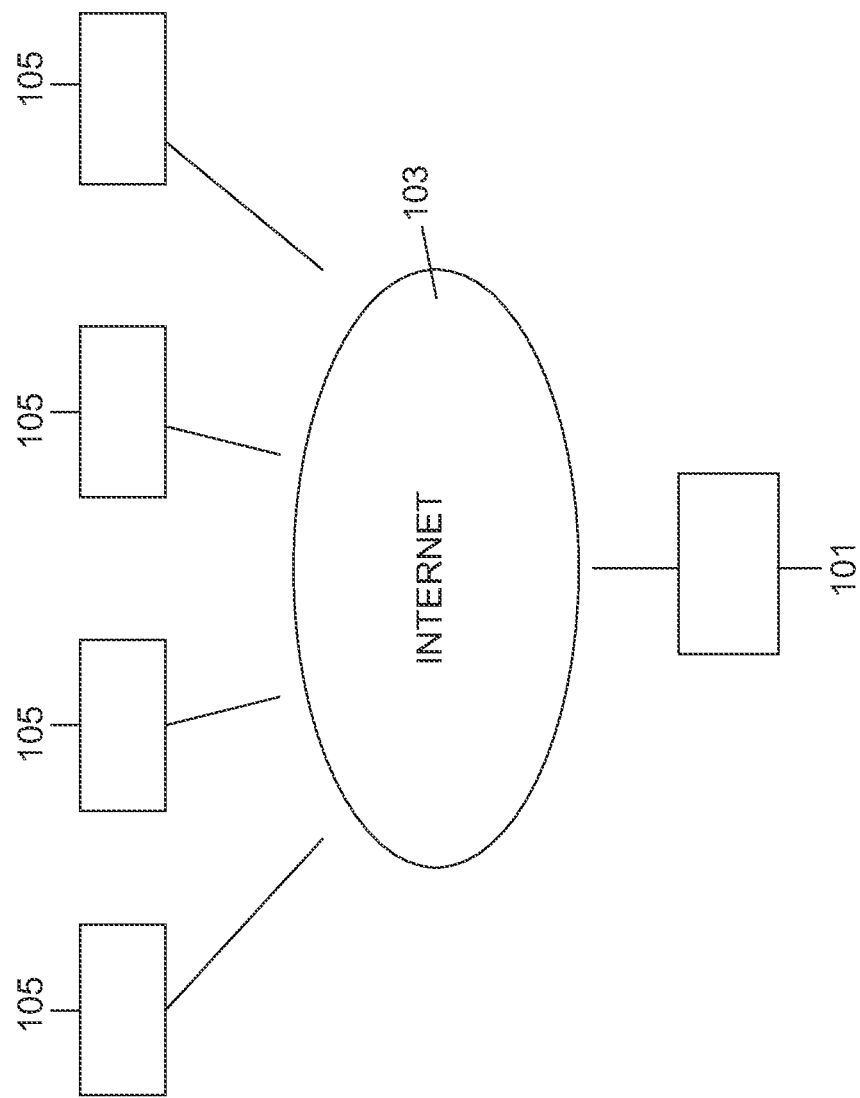
FIG. 1 is a schematic diagram of a network system implementing a preferred embodiment of the present invention.

FIG. 1 shows a schematic representation of a network system suitable for implementing the present invention. A user computer 101 is connected through a network (e.g. the Internet) 103 to a plurality of remote computers 105 (e.g. Internet servers). A user of computer 101 can navigate and "move" in a virtual environment which can be (and it normally is) distributed among several remote server computers 105.

Figure 2:
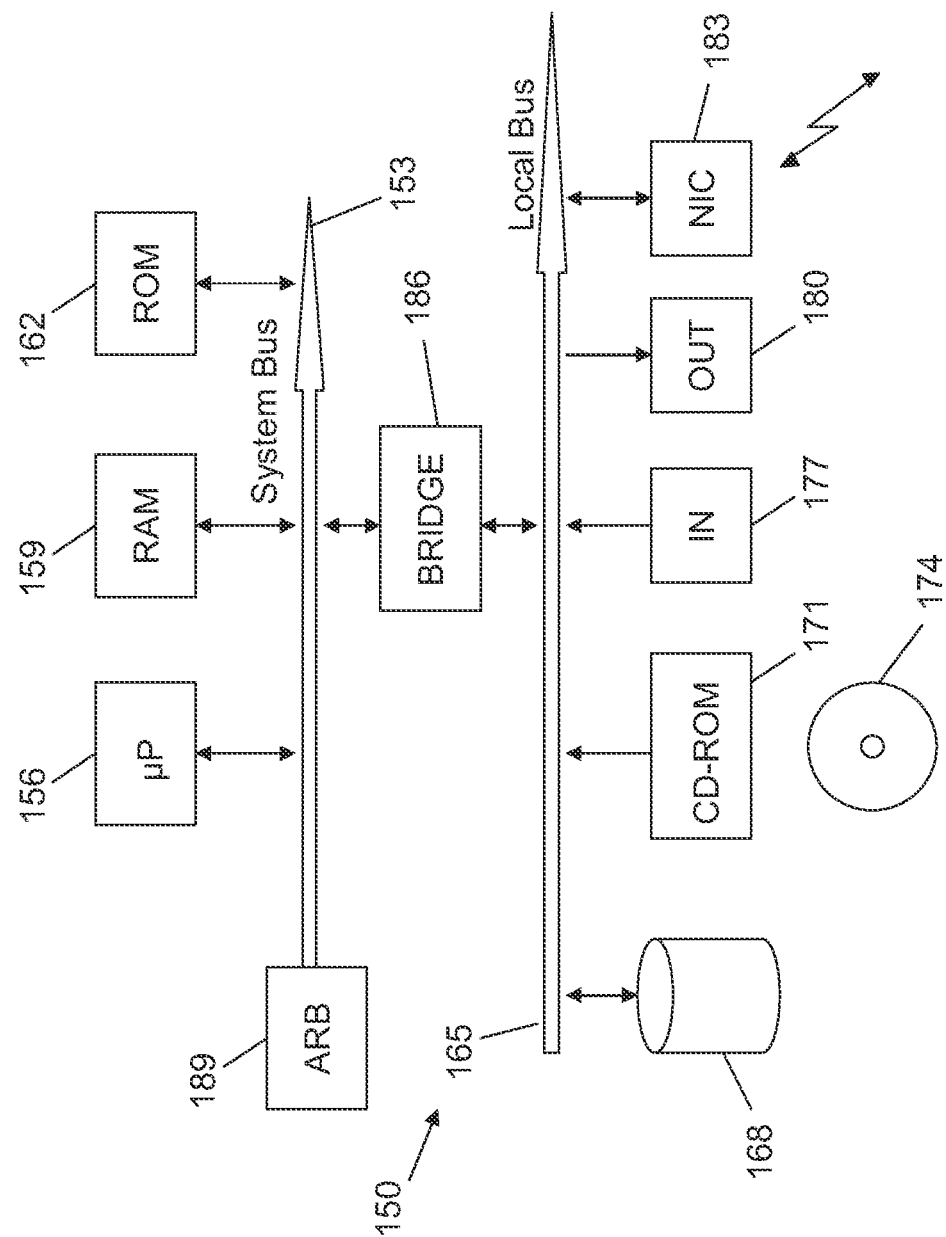
FIG. 2 is a block diagram of a generic computer system adapted to perform the method of a preferred embodiment of the present invention.

As shown in FIG. 2, a generic computer of the system (e.g. computer, Internet server, router, remote servers) is denoted with 150. The computer 150 is formed by several units that are connected in parallel to a system bus 153. In detail, one or more microprocessors 156 control operation of the computer 150; a RAM 159 is directly used as a working memory by the microprocessors 156, and a ROM 162 stores basic code for a bootstrap of the computer 150. Peripheral units are clustered around a local bus 165 (by means of respective interfaces). Particularly, a mass memory consists of a hard-disk 168 and a drive 171 for reading CD-ROMs 174. Moreover, the computer 150 includes input devices 177 (for example, a keyboard and a mouse), and output devices 180 (for example, a monitor and a printer). A Network Interface Card 183 is used to connect the computer 150 to the network. A bridge unit 186 interfaces the system bus 153 with the local bus 165. Each microprocessor 156 and the bridge unit 186 can operate as master agents requesting an access to the system bus 153 for transmitting information. An arbiter 189 manages the granting of the access with mutual exclusion to the system bus 153. Similar considerations apply if the system has a different topology, or it is based on other networks. Alternatively, the computers have a different structure, include equivalent units, or consist of other data processing entities (such as PDAs, mobile phones, and the like).

Figure 3B:
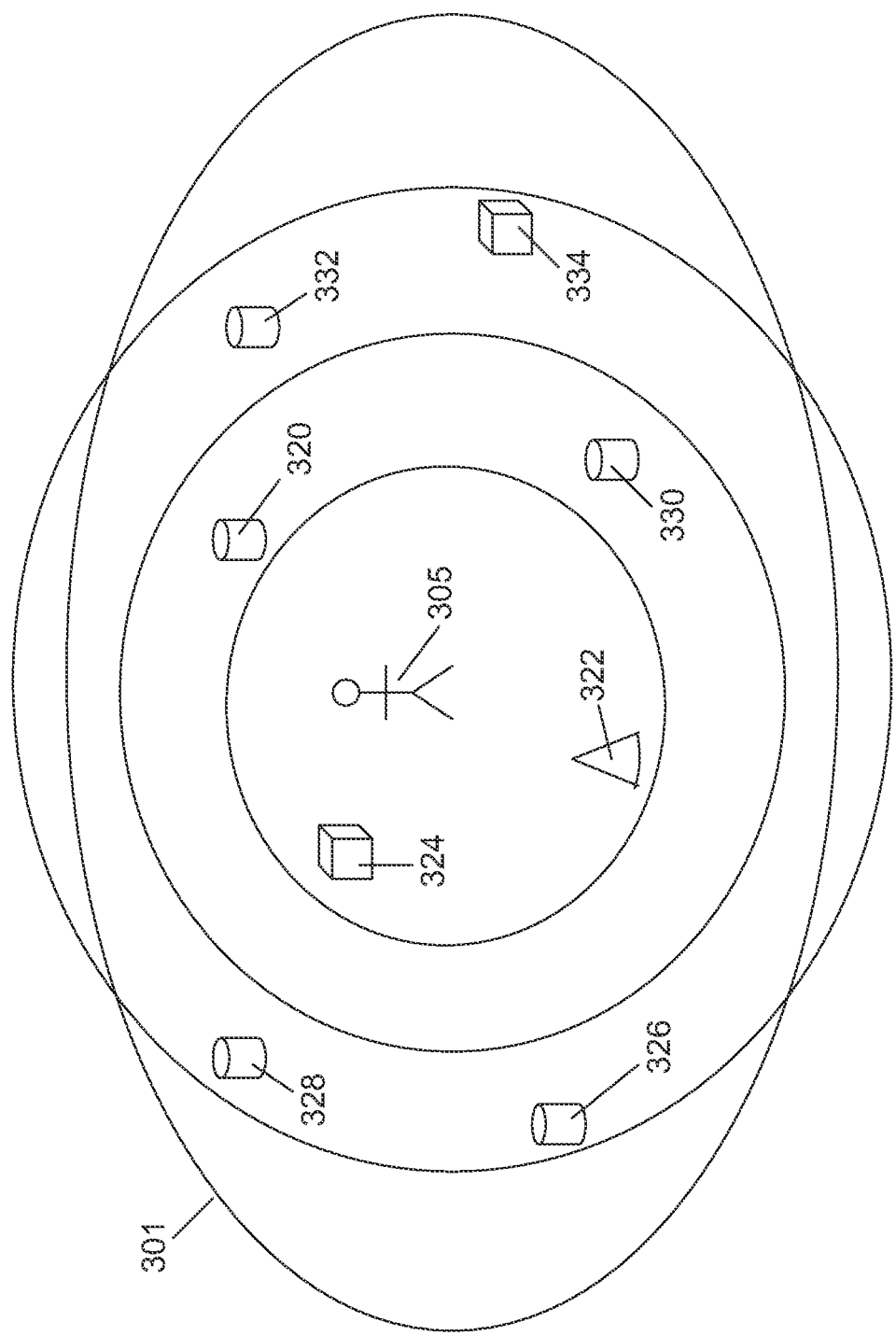

FIGS. 3a and 3b represent an environment which could implement a preferred embodiment of the present invention. FIG. 3a shows the implementation of the invention in the environment of the virtual world (301). The user position is shown by 305 and there are various objects with different attributes lying around the user. FIG. 3a shows eight objects (320 to 334), each defined with particular attributes, lying around in the environment of the user. As an example the following attributes could be defined for the represented object:

Object 320:
Shape: cylinder; Permissions: copy, modify
Price: 0; API used: change position and orientation.
Object 322:
Shape: cone; Permissions: no copy, no modify
Price: 10; API used: change shape.
Object 324:
Shape: cube; Permissions: copy, no modify
Price: 100; API used: none.
Object 326:
Shape: cylinder; Permissions: copy, modify
Price: 0; API used: change position and orientation.
Object 328:
Shape: cylinder; Permissions: copy, modify
Price: 0; API used: change position and orientation.
Object 330:
Shape: cylinder; Permissions: no copy, no modify
Price: 1000; API used: change position, orientation, shape, colour.
Object 332:
Shape: cylinder; Permissions: no copy, modify
Price: 10; API used: change shape.
Object 334:
Shape: cube; Permissions: copy, no modify
Price: 0; API used: none.

According to a preferred embodiment of the present invention, the user can perform a search for objects in the environment by selecting any combination of attributes known to the user, and it is not limited to 3D search as it was with known prior art systems. For example if the user is looking for any object that is modifiable and makes use of any APIs provided by the virtual world (i.e. it contains a script), the search result will return 320, 326, 328 and 332. Moreover, the location of the object may also be provided among the search results, together with the option to move to any of the object selected by the search. The search result can be returned as the objects are found or a list can be provided when the search is ended. In a further embodiment of the invention, represented in FIG. 3b, the search to be performed may be restricted within a range/distance centered on the user's position with different radius, e.g. R1, R2 and R3. In FIG. 3b R1 corresponds to the smaller (inner) circle, while R3 corresponds to the larger (outer) circle. When a range is specified, only objects found within that range and containing the attributes being searched are selected. For example, if a range R2 (medium) is specified, and the user searches for a cylinder which is modifiable, free (i.e. price=0) and which makes use of the APIs for changing position and orientation, the search result will select 320 only. Objects 326 and 328, which also contain all the attributes, will be omitted because they are outside the specified range.

Figure 4:
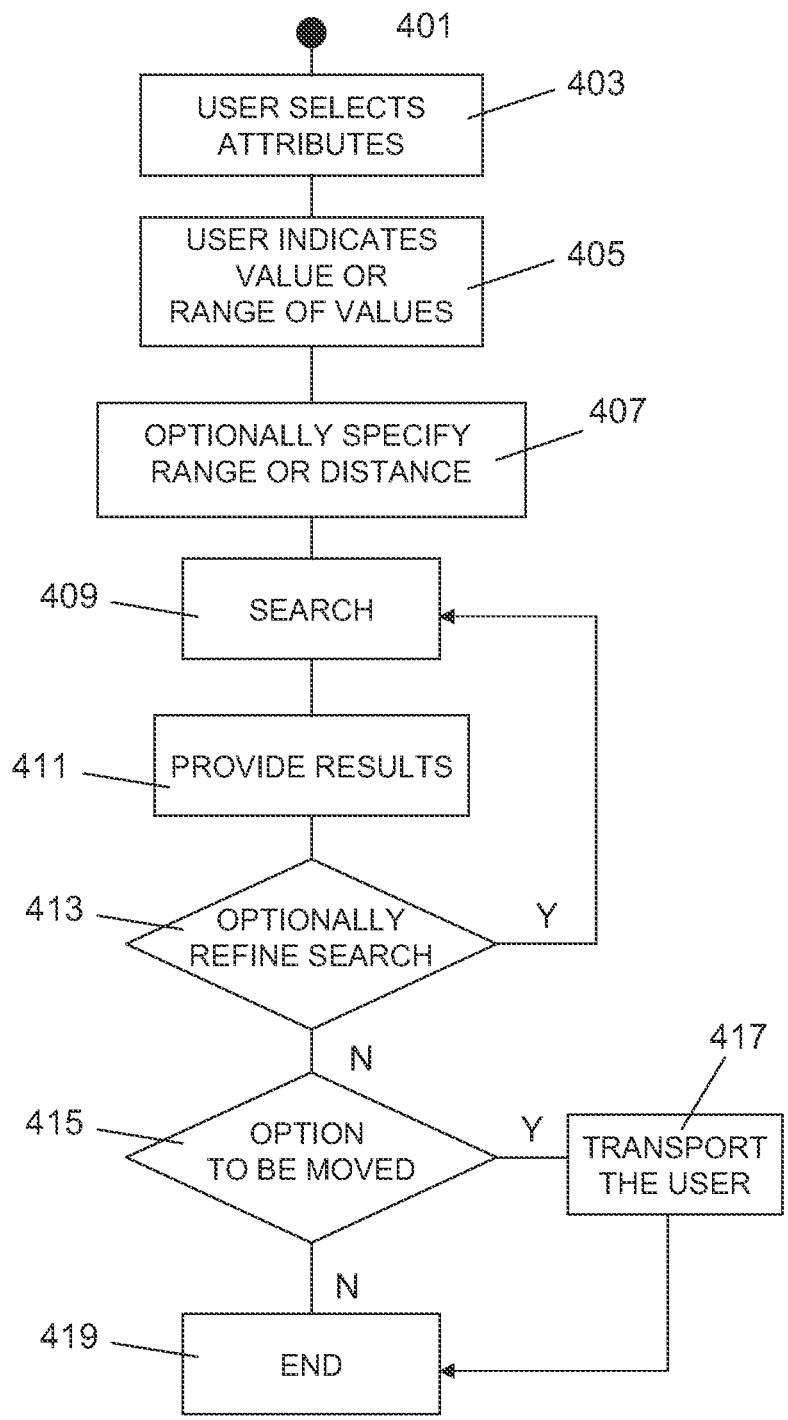
FIG. 4 shows a flowchart representing the steps to perform a search according to the present invention.

FIG. 4 schematically shows the method steps according to a preferred embodiment of the present invention. A virtual search assistant agent user interface is accessed by the user (step 401) and object attributes to be searched are selected (step 403). For each attribute a desired range of values may be indicated by the user (step 405). Optionally, a distance or a range centered on the user's position in the virtual environment can be specified in order to limit the search to that area around the user (step 407). At step 409 the search is then performed and the results (step 411) are provided to the user in one of the several options discussed above. The user can then decide at step 413 to refine the search by indicating further requirements (e.g. additional attributes, more detailed values or different distance). If the user selects the option of refining the search, the control goes back to step 409 and a new search is performed. In a preferred embodiment of the present invention the results are shown together with an indication of the position of the searched objects within the virtual world and the user is offered the possibility (step 415) of being "moved" to the position of the searched object. If the user wants to be moved, the system "transport" the user to the location, e.g. in a virtual shop (step 417), otherwise the process ends at step 419.

Search Query Interface

To provide the user with the ability of searching any attributes of an object, an appropriate user interface is supplied which allows the user to specify search criteria in a different way with respect to the classical text field where search keywords are typed into. The searchable attributes or characteristics of an object may include among others, the 3D geometry of the object, colour, texture, content or permission as options. Furthermore, the range/distance may be specified with reference to the current user position; the search will be performed within such range/distance. The interface may be almost identical to that already available for editing or inspecting the details of an existing object, the major difference being the possibility to use some search operator (as 'like' or comparison operators as '>') together with the values that the user wants to search an attribute for. Moreover, there may be provided different interfaces for different categories of objects (as already occurs for the current edit or details interfaces), which have different sets of attributes that can be searched. The search query interface may allow the user to specify search criteria as if he/she was editing an actual object. Every change to an attribute value with respect to its default may be transformed to a search criterion and the search query is built by concatenating all the specified criteria. The outcome of the search query interface would take the form of an actual object (a "search object") that is handed to the search assistant so that it can start executing the search.

The actual edit/inspect interface may also provide a set of additional editable fields, for instance:
  to allow the execution of search queries against complex objects, the user may have the chance to specify if the search criteria need to be applied to the container/root object of a composite object or to any of its children/parts; and
  to allow the execution of complex queries, it may be possible to specify which logical operator (AND, OR, NOT) to concatenate the specified search criteria.

Results Display

When the search assistant returns the list of results, the search assistant provides a 3D visual representation of the results to allow individual inspection of them. For example, a spherical volume may be defined whose radius length is the scaled-down distance from the current avatar position to the farthest object found. The scale factor is adjusted for every query so that the spherical volume has always the same size even if the size of found objects is different for every query. The center of the spherical volume that displays the search results may be the avatar's head or some other configurable point around and near the avatar. Each result of the list is then represented in that volume as an object(s) (for example a sphere or a cube, the actual shape may be configurable), whose position from the center of the volume matches the actual position of the found object with respect to the current avatar position i.e., the x, y, z coordinates of the result representation, with origin being the center of the spherical volume, are the actual coordinates of the actual found object with respect to the avatar, contracted by a scale factor so that the result representation falls within the search result volume (spherical volume as in above example). A search result may also be represented by more than one object.

If the user specified several criteria for its search query, the information about the "relevance" of each result (where by "relevance" we mean the number of search criteria met by a result) is also represented by varying some (possibly configurable) characteristic of the object(s) representing the result. For instance, assuming that each result is represented by one sphere in the search result volume, each sphere radius (or color, opacity, transparency) may be varied to represent a higher or lower "relevance" of the represented result—larger spheres could represent results with a large number of matched search criteria.

The objects representing results may be interactive: the user can hover the mouse pointer, click or right-click on them to retrieve information on the selected result (name, description, proximity of each result, list of matched/unmatched search criteria, position, nearby objects) and perform actions such as teleporting to object's actual location or retrieving the full list of attributes or contents of the actual object or even interact remotely with the actual found object (not the object representing it in the search result volume) if it is allowed to do so (e.g., if the object has the appropriate permissions, the user is allowed to copy it directly without even needing to teleport to the actual object position).

The search result may be further filtered or categorized after the search before displaying (for example by distance/range which may be specified from the centered current user position or by any area in the virtual system). The number of other selected objects (if any) that can be found near (for example within 2 meters) the position of a selected object may also be displayed. Other attributes of the item found may also be displayed, such as item name(s), people name(s) or group membership.

If any of the results falls within the visual range of the avatar its actual position can also be highlighted (for instance using a beacon) to further help the user find it quickly.

Moving objects, such as vehicles or other avatars or objects worn by avatars could be tracked by repeatedly performing the query at fixed interval so that the position of the result representation can be updated as it changes. This operation can be carried out automatically by the search assistant and be configurable in some of its aspects e.g., query repetition interval, maximum number of moving objects to track, maximum distance of moving objects to track, etc. By interaction with the result-representation object the user can decide to turn on/off position tracking for each result object.

The repeated periodical execution of the search query can be also useful to track objects that are being edited and thus undergoing changes for one or more of their attributes: in this case, the result "relevance" could vary and if that happens the result representation can be varied accordingly (if the result is represented by a sphere, its size—or color or opacity, or whatever attribute the user specified to represent relevancy—is modified as the number of met search criteria increases or decreases).

The exact position (coordinates) of each item returned as a result may also be displayed to enable the user to get (for example by teleport or transport) to the item.

Below are details of two exemplary scenarios of how the proposed embodiments of the invention may be used.

Scenario 1: Searching for Objects Having Specific Attribute Values

In this case, the user is looking for objects he/she can take (a copy) for free and modify. The user may use the "usual" search engine to perform a keyword-based search for places whose description contains the keyword "free". The search engine returns a list of places along with their description and some other information (e.g., number of visitors in the last n hours). Then the user chooses one of those places and reaches it; when there, the user knows that objects that she/he can take (a copy) for free are somewhere near him/her but does not know their exact location. So the user "calls" the "virtual world search assistant" and builds a query that, in some form, tells it to look for objects whose copy and modify attributes have the desired value (e.g., "true") and whose position is within say 100 meters of the user current position. The search assistant returns a list of results where each result has the form of:
  position (coordinates) of the result to allow a teleport/transport;
  number of searched items that can be found "near" (e.g., within 2 meters) the result's position; and
  other attribute values, e.g. item names.

The user can then quickly inspect the list of results to decide which to start from (e.g., the one with the largest number of items found or the one referring to an object with an interesting name), get there with a click and take/copy the desired object(s).

Scenario 2: Searching for Groups of People with Desired Skills

The user is looking for nearby people with the "modeling" or "scripting" skills. The user "calls" the "virtual world search assistant" and builds a query that tells it to look for people whose skills (i.e. interests in SecondLife) have the desired value (e.g., "modeling" or "scripting") and whose position is within say 100 meters of the user current position. The search assistant returns a list of results where each result has the form of:

position (coordinates) of the result to allow a teleport/ transport or send instant messages; and
  other attribute values, e.g. people names or group membership.

The user can then quickly inspect the list of results to decide which to start from, get there with a click or send IM and request help.

The two scenarios described above, while applied to different environments and for different purposes, they both use the method provided by the present invention. From the search assistant point of view it does not make a big different if the attributes used for the search are description of virtual objects or are representation of persons or group of persons.

Alterations and modifications may be made to the above without departing from the scope of the invention. Naturally, in order to satisfy local and specific requirements, a person skilled in the art may apply to the solution described above many modifications and alterations. Particularly, although the present invention has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the invention may be incorporated in any other embodiment as a general matter of design choice.

For example, similar considerations apply if the computers have different structure or include equivalent units; in any case, it is possible to replace the computers with any code execution entity (such as a PDA, a mobile phone, and the like).

Similar considerations apply if the program (which may be used to implement each embodiment of the invention) is structured in a different way, or if additional modules or functions are provided; likewise, the memory structures may be of other types, or may be replaced with equivalent entities (not necessarily consisting of physical storage media). Moreover, the proposed solution lends itself to be implemented with an equivalent method (having similar or additional steps, even in a different order). In any case, the program may take any form suitable to be used by or in connection with any data processing system, such as external or resident software, firmware, or microcode (either in object code or in source code). Moreover, the program may be provided on any computer-usable medium; the medium can be any element suitable to contain, store, communicate, propagate, or transfer the program. Examples of such medium are fixed disks (where the program can be pre-loaded), removable disks, tapes, cards, wires, fibers, wireless connections, networks, broadcast waves, and the like; for example, the medium may be of the electronic, magnetic, optical, electromagnetic, infrared, or semiconductor type.

In any case, the solution according to the present invention lends itself to be carried out with a hardware structure (for example, integrated in a chip of semiconductor material), or with a combination of software and hardware.

The invention claimed is:

1. A system for facilitating object search in a virtual world environment including a plurality of objects, each object being defined by a plurality of attributes, the system comprising:

a processor; and
  a memory coupled to the processor, wherein the memory comprises instructions which, when executed by the processor, cause the processor to:
  select, via user input, a set of first object attributes on which to perform the search;
  define for each first object attribute a desired value or a range of desired values;
  perform the search selecting a set of objects according to the user input thereby forming selected objects;
  detetermine a relevance factor by perform a similarity comparison between the set of first object attributes and the plurality of attributes of each of the selected objects; and
  present the selected objects a scaled down three-dimensional visual representation, scaled by a scale factor, showing the user's position and a location for the selected objects within the virtual world, wherein the selected objects are shown using x, y, and z coordinates from the user's position, wherein the scale factor of the scaled down three-dimensional visual representation is based on a distance between the user's position and a farthest object of the selected objects, and wherein the scale factor is adjusted over a plurality of queries so that each scaled down three-dimensional visual representation utilizes a largest scale factor from the plurality of queries.

2. The system of claim 1, wherein the instructions further cause the processor to:
  create an index of the plurality of objects, the index containing, for each object, the list of attributes which define the object.

3. The system of claim 1, wherein the instructions further cause the processor to:
  offer the user the option of being moved to the selected objects.

4. The system of claim 1, wherein the instructions for providing the search results further cause the processor to:
  indicate selected objects that are present within a specific range of each selected object.

5. The system of claim 1, wherein the instructions further cause the processor to:
  repeatedly perform the search query to track any movements of selected objects; and
  update the location of selected objects provided by the search results as it changes.

6. The system of claim 2, wherein the instructions further cause the processor to:
  select a spatial range centered with respect to a user position ire the virtual world environment within which to perform the search.

7. The system of claim 6, wherein the instructions to create the index is performed on those objects included in the selected spatial range, during the first search performed within the selected spatial range for later reuse.

8. The system of claim 1, wherein the selected objects on the three-dimensional visual representation are represented by three-dimensional visual representation objects having a plurality of variable characteristic(s).

9. The system of claim 8, wherein the three-dimensional object(s) characteristic(s) are varied based on the relevance factor.

10. The system of claim 9, wherein the map object is a spherical volume and the characteristic(s) comprise any combination of size, colour, or opacity of the spherical volume.

11. The system of claim 1, wherein the instructions farther cause the processor to:
    copy one selected object of the selected objects directly without being moved to the location of the selected object.

12. A computer program product comprising a non-transitory computer usable storage medium having a computer program for facilitating object search in a virtual world environment including a plurality of objects, each object being defined by a plurality of attributes stored therein, when the computer program is executed on a data processing system, the causes the data processing system to:
    select, via user input, a set of first object attributes on which to perform the search;
    define for each first object attribute a desired value or a range of desired values;
    perform the search selecting a set of objects according to the user input thereby forming selected objects;
    determine a relevance factor by performing a similarity comparison between the set of first object attributes and of attributes of each of the selected objects; and
    present the selected objects in a scaled do three-dimensional visual representation scaled by a scale factor, showing the user's position and a location for the selected objects within the virtual world, wherein the selected objects are shown using x, y, and z coordinates from the user's position wherein the scale factor of the scaled down three-dimensional visual representation is based on a distance between the user's position and a farthest object of the selected objects, and wherein the scale factor is adjusted over a plurality of queries so that each scaled down three-dimensional visual representation utilizes a largest scale factor from the plurality of queries.

13. The computer program product of claim 12, wherein the computer program further causes the data processing system to:
    create an index of the plurality of objects, the index containing, for each object, the list of attributes which define the object.

14. The computer program product of claim 12, wherein the computer program further causes the data processing system to:
    offer the user the option of being moved to the selected objects.

15. The computer program product of claim 12, wherein the computer program for providing the search results further causes the data processing system to:
    indicate selected objects that are present within a specific range of each selected object.

16. The computer program product of claim 12, wherein the computer program further causes the data processing system to:
    repeatedly perform the search query to track any movements of selected objects; and
    update the location of selected objects provided by the search results as it changes.

17. The computer program product of claim 13, wherein the computer readable program further causes the data processing system to:
    select a spatial range centered with respect to a user position in the virtual world environment within which to perform the search.

18. The computer program product of claim 17, wherein the computer readable program to create the index is performed on those objects included in the selected spatial range, during the first search performed within the selected spatial range for later reuse.

19. The computer program product of claim 12, wherein the selected objects on the three-dimensional visual representation are represented by three-dimensional visual representation objects having a plurality of variable characteristic(s).

20. The computer program product of claim 19, wherein the three-dimensional visual representation object(s) characteristic(s) are varied based on the relevance factor.

21. The computer program product of claim 20, wherein the map object is a spherical volume and the characteristic(s) comprise any combination of size, colour, or opacity of the spherical volume.

22. The computer program product of claim 12, wherein the computer program further causes the data processing system to:
    copy one selected object of the selected objects directly without being moved to the location of the selected object.

* * * * *